(12) United States Patent
Gosling et al.

(10) Patent No.: US 11,261,600 B2
(45) Date of Patent: Mar. 1, 2022

(54) SYSTEMS AND METHODS FOR SELECTIVELY POSITIONING WALL-MOUNTED DEVICES

(71) Applicant: DIRTT ENVIRONMENTAL SOLUTIONS, LTD., Calgary (CA)

(72) Inventors: Geoff W. Gosling, Calgary (CA); Colin V. Blehm, Calgary (CA)

(73) Assignee: DIRTT ENVIRONMENTAL SOLUTIONS LTD., Calgary (CA)

(*) Notice: Subject to any disclaimer, the term of this patent is extended or adjusted under 35 U.S.C. 154(b) by 0 days.

(21) Appl. No.: 16/339,925

(22) PCT Filed: May 8, 2018

(86) PCT No.: PCT/US2018/031574
§ 371 (c)(1),
(2) Date: Apr. 5, 2019

(87) PCT Pub. No.: WO2018/213062
PCT Pub. Date: Nov. 22, 2018

(65) Prior Publication Data
US 2020/0048899 A1 Feb. 13, 2020

Related U.S. Application Data

(60) Provisional application No. 62/508,558, filed on May 19, 2017.

(51) Int. Cl.
*E04B 2/74* (2006.01)
*A47B 57/06* (2006.01)
*A47B 96/02* (2006.01)

(52) U.S. Cl.
CPC .......... *E04B 2/7422* (2013.01); *E04B 2/7448* (2013.01); *A47B 57/06* (2013.01);
(Continued)

(58) Field of Classification Search
CPC .... E04B 2/7407; E04B 2/7422; E04B 2/7448; E04B 1/40; E04B 2002/7483; E04B 2002/7488
See application file for complete search history.

(56) References Cited

U.S. PATENT DOCUMENTS 2,650,387 A 9/1953 Foss
2,668,317 A 2/1954 Bon, III
(Continued)

FOREIGN PATENT DOCUMENTS

AU 06291/00 B2 9/1992
CA 2840843 A1 12/2013
(Continued)

OTHER PUBLICATIONS

International Search Report and Written Opinion dated Sep. 13, 2018 from International Patent Application No. PCT/US2018/031574, filed May 8, 2018.
(Continued)

*Primary Examiner* — Babajide A Demuren
(74) *Attorney, Agent, or Firm* — Workman Nydegger

(57) ABSTRACT

A functional wall module for at least partially forming an individual space in a building and for positioning and selectively repositioning one or more objects within the individual space. In one implementation, the functional wall module includes a frame having a plurality of frame supports that define an interior space of the frame. The functional wall module additionally includes a bracket configured to support or couple to moveable platforms, the bracket comprising one or more bracket arms extending away from the interior space and from the frame. The functional wall module additionally includes a positioning mechanism
(Continued)

within the interior space and connected to the bracket such that the positioning mechanism is operable to reposition the bracket.

19 Claims, 4 Drawing Sheets

(52) U.S. Cl.
CPC ....... *A47B 96/02* (2013.01); *E04B 2002/7483* (2013.01); *E04B 2002/7488* (2013.01)

(56) References Cited

U.S. PATENT DOCUMENTS

| | | | |
|---|---|---|---|
| 3,820,478 A | | 6/1974 | Bergenthal |
| 4,022,136 A | | 5/1977 | Schott |
| 4,804,066 A | | 2/1989 | Fusaro et al. |
| 4,880,285 A | | 11/1989 | Brinkers |
| 4,881,471 A | * | 11/1989 | Schwartz .................. A47B 9/06 108/147 |
| 4,969,403 A | * | 11/1990 | Schwartz .................. A47B 5/00 108/147 |
| 4,987,835 A | * | 1/1991 | Schwartz ............... A47B 57/30 108/147 |
| 5,083,514 A | * | 1/1992 | Schwartz .................. A47B 5/00 108/108 |
| 5,177,917 A | * | 1/1993 | del Castillo Von Haucke ............ E04B 2/7409 52/220.7 |
| 5,181,620 A | | 1/1993 | Watt |
| 5,370,063 A | | 12/1994 | Childers |
| 5,373,793 A | | 12/1994 | Crossman |
| 5,682,825 A | | 11/1997 | Manner |
| 5,809,908 A | | 9/1998 | Catta et al. |
| 3,033,014 A | | 3/2000 | Nightengale |
| 6,676,233 B1 | | 1/2004 | Evans et al. |
| 7,412,931 B2 | | 8/2008 | Seidl et al. |
| 7,461,484 B2 | * | 12/2008 | Battey ................... E04B 2/7425 52/220.7 |
| 7,469,512 B2 | * | 12/2008 | Faber .................... E04B 2/7433 52/220.2 |
| 7,676,992 B2 | * | 3/2010 | Burns ................... E04F 13/081 52/35 |
| 7,703,242 B2 | | 4/2010 | Goebel et al. |
| 8,186,281 B2 | | 5/2012 | Bastian et al. |
| 8,256,358 B2 | | 9/2012 | Looser |
| 8,424,983 B1 | | 4/2013 | Strauss et al. |
| 9,593,481 B2 | | 3/2017 | Gosling et al. |
| 9,693,624 B2 | * | 7/2017 | Mitchell ................. A47B 9/00 |
| 2001/0037751 A1 | | 11/2001 | Agee |
| 2002/0059679 A1 | | 5/2002 | Weismiller et al. |
| 2002/0171015 A1 | | 11/2002 | Gosling |
| 2004/0022615 A1 | | 2/2004 | Land |
| 2005/0172869 A1 | | 8/2005 | Schmidt |
| 2006/0180057 A1 | | 8/2006 | Hallman |
| 2008/0193062 A1 | | 8/2008 | Ropp |
| 2012/0055293 A1 | | 3/2012 | Urick et al. |
| 2012/0210949 A1 | | 8/2012 | Polacek |
| 2012/0248046 A1 | | 10/2012 | Warner |
| 2013/0241384 A1 | | 9/2013 | Strauss et al. |
| 2015/0075086 A1 | | 3/2015 | Gosling et al. |
| 2016/0066732 A1 | * | 3/2016 | Sarvestani ......... A47G 29/1201 232/24 |
| 2016/0213146 A1 | * | 7/2016 | Gosling .................. A47B 9/12 |
| 2016/0353876 A1 | | 12/2016 | Mitchell et al. |
| 2018/0168334 A1 | * | 6/2018 | Swartz .................. A47B 21/06 |
| 2018/0344024 A1 | * | 12/2018 | Kruger ..................... A47B 9/04 |

FOREIGN PATENT DOCUMENTS

| | | | |
|---|---|---|---|
| CA | 2851489 | A1 | 11/2014 |
| CN | 204132702 | | 2/2015 |
| EP | 0083929 | | 7/1983 |
| EP | 0916284 | A2 | 5/1999 |
| GB | 2430869 | A | 4/2007 |
| JP | 06-020429 | Y2 | 6/1994 |
| JP | 07-000010 | | 1/1995 |
| JP | 07-000103 | | 1/1995 |
| JP | 07-150758 | A | 6/1995 |
| KR | 10-2011-0012547 | A | 2/2011 |
| KR | 10-2011-0125477 | A | 11/2011 |
| KR | 2011-0125477 | A | 11/2011 |
| NL | 8204262 | A | 6/1983 |
| WO | 00/24291 | A1 | 5/2000 |
| WO | 00/54628 | A1 | 9/2000 |
| WO | 2018/213062 | A1 | 11/2018 |

OTHER PUBLICATIONS

European Invitation pursuant to Rule 62a(1) for EP Patent Application No. 18802712.2, dated Sep. 28, 2020, 4 pages.
Singapore Written Opinion received for SG Application No. 11201906114Q, dated Jan. 12, 2021, 6 pages.
European Search Report and Search Opinion Received for EP Application No. 18802712.2, dated Feb. 9, 2021, 9 pages.
Response to Sep. 28, 2020 European Office Action for European Application No. 18802712.2, dated Nov. 27, 2020. (8 pages).
European Search Report and Search Opinion Received for EP Application No. 13800179.7, dated Feb. 2, 2016, 9 pages.
International Search Report and Written Opinion for application No. EP14836683 dated Sep. 29, 2016.
International Search Report and Written Opinion for PCT/US2013/045024 dated Jun. 10, 2013.
International Search Report and Written Opinion for PCT/US2014/050586 dated Dec. 3, 2014.
Office Action received for European Patent Application No. 13800179.7, dated Dec. 15, 2020, 12 pages.
Office Action received for European Patent Application No. 13800179.7, dated Feb. 8, 2019, 5 pages.
Written Opinion for application No. 11201605987U dated Jun. 27, 2018.
International Search Report and Written Opinion for PCT/US2020/023935 dated May 25, 2020.
International Preliminary Report on Patentability received for PCT Patent Application No. PCT/US2020/023935, dated Sep. 30, 2021, 8 pages.

* cited by examiner

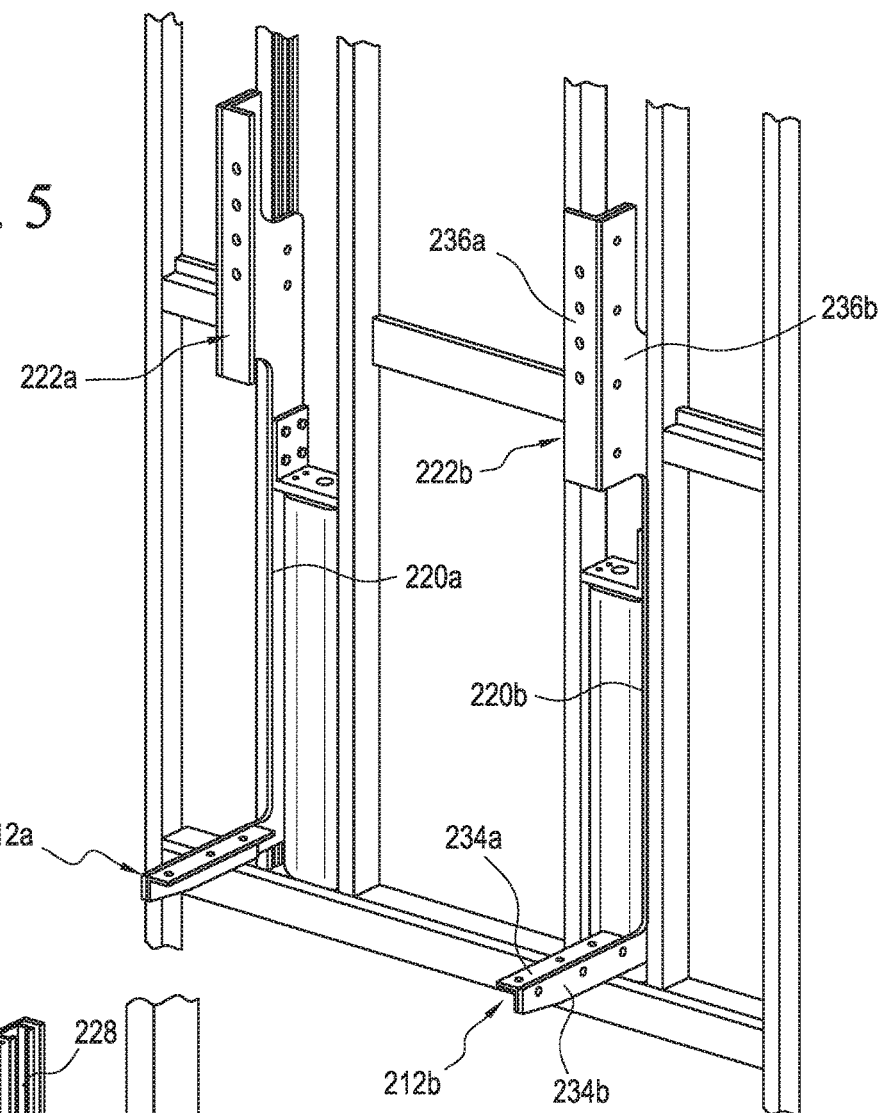

SYSTEMS AND METHODS FOR SELECTIVELY POSITIONING WALL-MOUNTED DEVICES

CROSS-REFERENCE TO RELATED APPLICATIONS

The present invention is a 35 U.S.C. § 371 U.S. National Stage of PCT Application No. PCT/US2018/031574, filed on May 8, 2018, which claims priority to U.S. Provisional Patent Application No. 62/508,558, filed May 19, 2017. The entire content of each of the aforementioned patent applications is incorporated herein by reference.

BACKGROUND

1. Technical Field

This disclosure relates to systems, methods, and apparatus for selectively positioning objects near a wall or a similar surface.

2. Related Technology

A builder or installer may use modular walls to divide an open space within a building into individual spaces. Generally, modular walls can include a series of wall modules that connect to each other. The individual wall modules can be freestanding or rigidly attached to one or more support structures. In particular, a manufacturer or assembler can align and join various wall modules together to divide an open space and by doing so form individual spaces, such as an office, a room, a hallway, etc.

At least one advantage of modular walls is that they are often relatively easy to configure. In addition, modular wall systems can be less expensive to set up and can allow for reconfiguration more easily than permanent office dividers. For example, using modular wall systems, an installer may quickly form offices, conference areas, etc., in an undivided space of the building. If the user or occupants of the building desire to change the office space, they can readily reconfigure the space and may partially reuse existing wall modules or modular walls.

Unfortunately, many conventional modular walls do not provide movable shelves, cabinets, work surfaces, etc. without requiring disassembly, repositioning, and reassembly of various components of the modular wall. Further, some conventional modular walls that automate movement of shelves, cabinets, etc., often require unsightly mechanisms that may interfere with selecting a position of such shelves or other components and the modular wall and often preclude the utility of movable shelves, cabinets, etc. in combination with other shelves, cabinets, etc. in or around the same space. Accordingly, there are a number of disadvantages in wall modules and modular walls that can be addressed.

BRIEF SUMMARY

Implementations of the present disclosure provide systems, methods, and apparatuses for positioning and/or selectively repositioning one or more objects within an individual space. More specifically, implementations include a functional wall module having a single or multiple movable brackets for supporting or securing one or more objects. Movement of the movable bracket(s) can selectively position and/or reposition such objects within the individual space. Furthermore, the functional wall module can at least partially form or define the individual space.

For example, a functional wall module of the present disclosure includes a frame comprising a plurality of frame supports—the frame defining an interior space of the functional wall module—and an interior support disposed within the interior space and connected to one of the plurality of frame supports. The functional wall module additionally includes a bracket associated with the interior support and comprising one or more bracket arms extending away from the interior space and from the frame, the bracket arms being configured to support or couple to one or more movable platforms. The functional wall module additionally includes a positioning mechanism within the space and connected to the bracket that is operable to reposition the bracket.

Accordingly, a functional wall module, modular wall, and systems for implementing one or more of a functional wall module and a modular wall to at least partially form an individual space in a building and to position and selectively reposition one or more objects within the individual space are disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 5 illustrates a partial perspective view of a functional wall module with an exposed positioning mechanism and height adjustable bracket in accordance with one implementation of the present invention;

FIG. 6 illustrates a perspective view of a guide member associated with a bracket of the positioning mechanism in accordance with one implementation of the present invention;

DETAILED DESCRIPTION

Figures 1, 2:
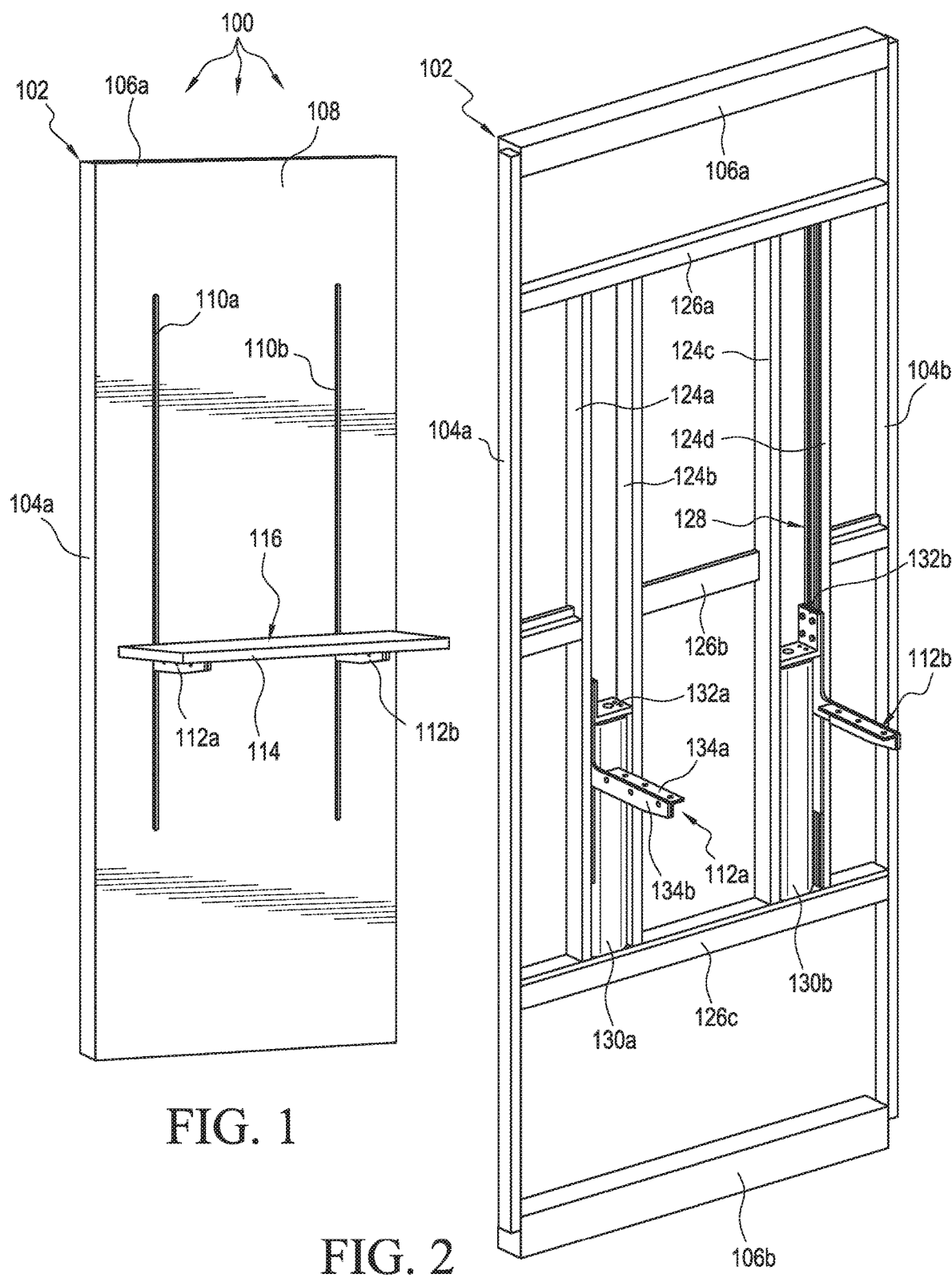
FIG. 1 illustrates a perspective view of a functional wall module in accordance with one implementation of the present invention.
FIG. 2 illustrates a perspective view of a functional wall module with an exposed positioning mechanism in accordance with one implementation of the present invention.

Implementations of the present disclosure provide systems, methods, and apparatuses for positioning and/or selectively repositioning one or more objects within an individual space. More specifically, implementations include a functional wall module having a single or multiple movable brackets for supporting or securing one or more objects. Movement of the movable bracket(s) can selectively position and/or reposition such objects within the individual space. Furthermore, the functional wall module can at least partially form or define the individual space.

For instance, multiple functional wall modules as well as nonfunctional wall modules may form a modular wall. Particularly, the functional and/or nonfunctional wall modules can selectively and detachably connect to one another in a manner that forms the modular wall. Moreover, the modular wall can subdivide an open space within a building and/or may define one or more individual spaces. Also, as mentioned above, the functional wall modules can include one or more movable platforms disposed on an interior portion of the functional wall module. For example, a user or occupant of the individual space may position the movable platform at a selected or chosen location on the functional wall module. Likewise, the user also may reposition the movable platform to a different selected location on the functional wall module.

Implementations also may include a drive or positioning mechanism that can position and/or reposition the movable platform on the functional wall. For instance, the positioning mechanism can facilitate automated or manual positioning and/or repositioning of the movable platforms. In one example, a user may position the movable platform at a desired location by pressing and/or holding a control button, which may activate the positioning mechanism. When activated, the positioning mechanism can move the movable platform in a selected direction.

The movable platform may include a support surface that can support one or more objects thereon. Generally, the movable platform can support any number of objects and may serve any number of purposes, which may vary from one implementation to the next. For example, the movable platform can provide a support surface similar to or the same as a shelf, a desk or a table, or any number of other support surfaces. Hence, in one instance, the movable platform can provide a writing and/or working surface for the user of the individual space.

In one or more implementations, the positioning mechanism can move the movable platform in a vertical direction (e.g., vertically relative to the functional wall module). For example, the movable platform can move upward or downward relative to the functional wall module. In additional or alternative implementations, the movable platform may move horizontally (e.g., parallel to the floor). Similar to the vertical movement, the horizontal movement of the movable platform also may be bidirectional, such that the movable platform may move in first and/or in second, opposition directions (e.g., to the left and to the right relative to the functional wall module).

The functional wall module can include cladding or panels, which may connect to a frame of the functional wall module. In an implementation, an installer or assembler may locate the positioning mechanism behind the panel of the functional module. For instance, the positioning mechanism may connect to the frame of the functional wall module, behind the panel (or between opposing panels), as described below in further detail. Thus, the panel(s) of the functional wall module can at least partially conceal the positioning mechanism (e.g., when the wall structure is viewed from certain perspectives). The positioning mechanism may operably connect to the movable platform in a manner that allows the positioning mechanism to move the movable platform relative to the functional wall module. Furthermore, a control mechanism can activate the positioning mechanism to move the movable platform on the functional wall module.

In one or more implementations, the positioning mechanism is operably connected to bracket arms that extend through the face of the panel and associate with the movable platform such that repositioning of the bracket arms by the positioning mechanism similarly repositions the movable platform. Generally, the bracket can include any number of bracket arms at any interval along the bracket. For example, the bracket can include a lower bracket arm and an upper bracket arm separated by a distance. When repositioned, the distance between the lower and upper bracket arms remains the same.

Each of the lower and upper bracket arms can be associated with a movable shelf, cabinet, work surface, etc. In an implementation, the lower bracket arm is associated with a movable work surface and the upper bracket arm is associated with a compartment or cabinet. As provided in this exemplary implementation, the bracket is a solitary piece having upper and lower bracket arms at opposing ends thereof, and in response to repositioning of the bracket by the associated positioning mechanism, the upper and lower bracket arms—and the cabinet and work surface respectively associated therewith—are similarly repositioned. Further, the distance between the upper and lower bracket arms remains constant.

In one or more implementations, the bracket and positioning mechanism are additionally supported by interior infrastructure elements, such as horizontal and vertical supports. One or more of the vertical supports can include a guide member configured to stabilize and/or promote the smooth movement of the bracket during repositioning. For example, the guide member can include a track, and the upper and/or lower bracket arms can be associated with one or more roller bearings that ride along the track.

Referring now to the Figures, FIG. 1 illustrates a wall structure or functional wall module 100 according to an implementation of the present invention. The functional wall module 100 includes a frame 102 that can permanently, selectively, or removably secure a panel 108. The panel 108 may have any suitable appearance or aesthetic, including colors, patterns, designs, etc., and if made from a translucent and/or opaque material, the panel 108 conceals an interior space of the frame 102 when secured thereto.

In one implementation, the frame 102 can include sufficiently rigid material to support the wall module 100 in an upright orientation. For example, the frame 102 can include steel, other metal alloys, aluminum (bar, extrusions, etc.), polymers, wood, etc. Additionally, the material comprising the frame 102 may be sufficiently rigid and strong to support the panel 108 as well as other component or elements of the wall module 100 in a desired orientation.

Generally, the panel 108 can comprise any suitable material, which may vary from one implementation to the next. In at least one implementation, the panel 108 includes rigid and/or resilient materials (similar to or the same as the materials used in or suitable for the frame 102). As such, the panel 108 provides additional rigidity and/or support to the frame 102, when connected thereto. In alternative implementations, the panel 108 includes flexible or sheet-like material (such as fabric), which may conceal the interior space defined by the frame 102 but may not provide substantial support to the frame 102.

Additionally, the frame 102 of a wall module, or a portion thereof, can connect to a frame (or a portion thereof) of an adjacent wall module. Hence, in at least one instance, the functional wall module 100 couples to other functional or nonfunctional wall modules, which together form a modular wall defining at least a portion of one or more individual spaces. Additionally, or alternatively, the functional wall module 100 can connect to a permanent wall or other structure in the building.

As depicted in at least FIGS. 1 and 2, the frame 102 includes two opposing vertical frame supports 104a, 104b and two opposing horizontal frame supports 106a, 106b, which interconnect to form the frame 102. As illustrated in FIG. 1, the panel 108 connects to the vertical and/or horizontal frame supports. It should be appreciated that the frame can include any number of vertical and/or horizontal supports, which may vary from one implementation to the next. Moreover, the vertical and/or horizontal supports of the frame 102 may connect to one another in any number of suitable configurations, thereby forming or defining the shape of the frame 102.

For example, as illustrated in FIG. 1, the frame 102 can form an approximately rectangular shape. In additional or alternative implementations, the frame may define other shapes, such as a polygonal shape (e.g., triangular, trapezoidal, hexagonal, etc.), an arcuate shape (e.g., circular, elliptical, etc.), or combinations thereof. Regardless of the configuration, the vertical and horizontal supports can connect together to form the frame, onto which a panel can be secured.

In one or more implementations, the panel can connect to the frame to create or form a vertical wall surface. In an implementation, the panel permanently connects or couples to the frame. Alternatively, the panel may removably and/or selectively connect to the frame. As such, a user/modular wall assembler may remove the panel from the frame (e.g., to service any elements or components of the functional wall module located behind the panel) and may reconnect the panel to the frame thereafter.

Furthermore, in one or more implementations, functional wall modules can incorporate any number of panels (similar to or the same as the panel 108). For example, the functional wall module 100 can include a second panel connected to the frame 102 opposite to the panel 108 (e.g., the panels may connect to front and back sides of the frame 102). Moreover, in an implementation, multiple panels can connect to the frame on the same side. In other words, the panel or cladding on the front side of the frame can include multiple segments connected to the frame. Similarly, the panel can be sized and/or shaped such that the panel only partially covers the frame, thereby at least partially concealing elements and/or components of the functional wall module.

As depicted in FIG. 1, the functional wall module 100 can include a panel 108 having bracket slots 110a, 110b. Although depicted as having two bracket slots 110a, 110b, it should be appreciated that in one or more implementations, the panel can include a single bracket slot or a plurality of bracket slots. Generally, the bracket slots are disposed on an interior portion of the panel, and as depicted in FIG. 1, the bracket slots 110a, 110b can be elongated and disposed vertically on the panel 108.

The functional wall module 100 of FIG. 1 also includes a movable component, such as a movable platform 114. The movable platform 114 is configured to move vertically relative to the frame 102 and/or the panel 108. In additional or alternative implementations, the movable platform can be configured to move horizontally relative to the frame and/or the panel. Generally speaking, the movable platform can be positioned at a desired location relative to the functional wall module and can support or secure one or more objects thereby at a desired location relative to the functional wall module.

The movable platform 114 of FIG. 1 includes a support surface 116, which may carry one or more objects. Although the movable platform 114 is depicted as a shelf or shelving unit, the movable platform can be any of, for example, a cabinet, a work surface (e.g., a desktop), and/or any other component and/or support surface. Consequently, the support surface 116 may support and move many kinds of objects, including books, computer components (computer, monitor, input devices, etc.), phones, frames, etc. It should be appreciated that the above-described objects are only exemplary and not intended to limit the scope of this disclosure. Particularly, the movable platform 114 can support and/or move any number of suitable objects, which may vary from one implementation to another.

In at least one implementation, objects can be connected to the movable platform (e.g., to a side opposing to the support surface 116). In other words, the movable platform can secure and carry objects that are not supported by the support surface of the movable platform. For example, a curtain or a sheet of fabric may connect to the movable platform in a manner that the movable platform can move the curtain in a vertical direction, upward and/or downward or side-to-side in a horizontal direction.

As further provided in FIG. 1, the movable platform 114 is movably connected to the functional wall module 100 by bracket arms 112a, 112b. The bracket arms 112a, 112b protrude through the bracket slots 110a, 110b, respectively, and can transit at least a portion of the bracket slots 110a, 110b vertically at the direction of a user. The bracket slots 110a, 110b are aligned with at least a portion of the path that the brackets arms 112a, 112b may transit, and the width of the brackets slots 110a, 110b are sufficient so as to allow the bracket arms 112a, 112b to slidably move within the bracket slots 110a, 110b.

In one or more implementations, the bracket arms have a width that is greater than the thickness thereof. As such, the bracket arms can traverse the length of the bracket slot but are prevented from rotating therein. For example, the width of the bracket slots may provide a small clearance relative to the thickness of the bracket arms extending through the slots (e.g., 0.005", 0.01", 0.1", or similar) such that the portion of the bracket arms extending through the slots can slide within the slots but may not have sufficient clearance to rotate therein. Consequently, the bracket arms can support the movable platform in a manner that allows the movable platform to be advanced upward and downward along vertically oriented bracket slots while preventing or limiting the movable platform from rotating or tilting relative to the panel and/or the bracket slots.

In one or more implementations, at least a portion of each bracket arm is sized and shaped to traverse the bracket slot and is further aligned with at least a portion of the length of the bracket slot. For example, the bracket slots 110a, 110b of FIG. 1 align with at least a portion of the vertical path that can be transited by bracket arms 112a, 112b.

In an implementation, the bracket slots include one or more portions that are of a wider dimension than at least some other portion of the bracket slots. This may be advantageous, for example, in implementations where a bracket arm has a first portion that is narrow and which is sized and shaped to traverse a complementary narrow bracket slot (e.g., the narrow vertical neck of bracket arms 112a, 112b in FIG. 1) but also has a second portion that is greater in dimension, includes two orthogonal surfaces (such as surfaces 134a, 134b of FIG. 2), or is otherwise sized and/or shaped such that it would not traverse a narrow bracket slot.

In an exemplary implementation, the frame 102 of a modular wall 100 is assembled, and a panel 108 having bracket slots 110a, 110b is attached to a front face of the frame 102. The bracket arms 112a, 112b can be subsequently associated with the modular wall 100 by inserting the narrow portion of each bracket arm 112a, 112b through the bracket slots 110a, 110b, respectively. The bracket arms 112a, 112b can be secured to an interior support member (or other components of the modular wall, such as a positioning mechanism) from the non-paneled, rear side of the frame.

Alternatively, the bracket arms can initially be secured to the frame, and the wider dimensioned portions of the bracket slots can enable a panel to be placed over the bracket arms such that the bracket arms protrude through the panel when the panel is attached to the frame.

FIG. 2 illustrates the functional wall module 100 of FIG. 1 with panel 108 having been removed to reveal the contents associated with the space defined by the frame 102. The movable platform 114 has been omitted from FIG. 2 for the sake of clarity in describing the interior components of the functional wall module of FIG. 1. As can be seen in FIG. 2, the bracket arms 112a, 112b are connected to positioning mechanisms 130a, 130b, respectively, by bracket connection plates 132a, 132b. The positioning mechanisms 130a, 130b can include any number or type of suitable actuators that act to selectively adjust the position of the bracket arms 112a, 112b and any associated movable platform.

For example, the positioning mechanism can include actuators and the power source for activating the actuators. In one implementation, an actuator includes a cylinder barrel and corresponding cylinder piston, where the cylinder piston extends outward and moves linearly relative to the cylinder barrel. Particularly, movement of the cylinder piston in a first direction can increase the overall length of the actuator while movement of the cylinder piston in a second direction can decrease the overall length of the actuator given a stationary cylinder barrel. By connecting the cylinder piston to a bracket (or associated bracket connection plate), the actuator acts to move the associated bracket arm in one or more directions.

It should be appreciated that actuators can include any linear actuator and can include actuators that are actuated in various ways, including pressurized fluid (e.g., air, hydraulic fluid, etc.), electromagnetic actuation (e.g., a series of electromagnets activated sequentially), etc. In at least one implementation, the actuator is at least partially automated, which can allow the user to activate the actuator by, for example, depressing a control switch. In other implementations, a user manually activates the actuators. Hence, the power source can receive a signal or command to activate an actuator and can provide such activation (e.g., by supplying fluid, electrical power, etc. to the actuator). Alternatively, the power source can receive a manual input of energy to activate the actuators. For example, the power source may be a mechanical fluid pump that when operated supplies pressurized fluid into the actuators, thereby activating the actuators and moving the cylinder pistons.

In many implementations, the power source controls the movement of the actuator to a selected position. For example, as noted above, for hydraulic cylinder type actuators, the power source initiates and/or regulates fluid flow into and out of such actuators. In another example, the power source supplies power to electrical actuators to enact movement of the associated bracket arms to a selected location. More specifically, the cylinder pistons may move while power is being supplied by the power source and may stop when the power source stops supplying power to the actuators.

The power source can vary between implementations. For example, the power source can be a battery pack in electrical communication with the actuators. Alternatively, the power source can be configured to communicate directly with an electrical outlet. Thus, in one or more implementations, the power source can operate on AC and/or DC current. Additionally, in one or more implementations, the power source is directly associated with the positioning mechanism or is otherwise provided within the interior portion bounded by the wall module frame.

Referring back to FIG. 2, the positioning mechanisms 130a, 130b are coupled to the bracket arms 112a, 112b and are operable to translocate the bracket arms 112a, 112b from one position to another, as described above. The positioning mechanisms 130a, 130b can be associated with interior horizontal supports 126a, 126b, 126c and interior vertical supports 124a, 124b, 124c, 124d to horizontally and vertically orient and/or structurally support positioning mechanisms 130a, 130b at a location within frame 102. In some implementations, the interior horizontal and vertical supports can be placed in varying locations within the frame of the wall module to selectively adjust the distance between two or more positioning mechanisms (and thereby the associated bracket arms) and/or the height of the positioning mechanisms (and thereby the associated bracket arms) within the frame of the wall module.

As illustrated in FIG. 2, at least one of the interior vertical supports 124d includes a guide member 128. The guide member is associated with at least a portion of bracket arm 112b and is configured to stabilize and/or promote the smooth movement of the bracket arm 112b during repositioning. As described in more detail below, the guide member 128 can include a track for use and association with a roller bearing and/or a wheel, a rack for use and association with a pinion, or similar.

Figures 3, 4:
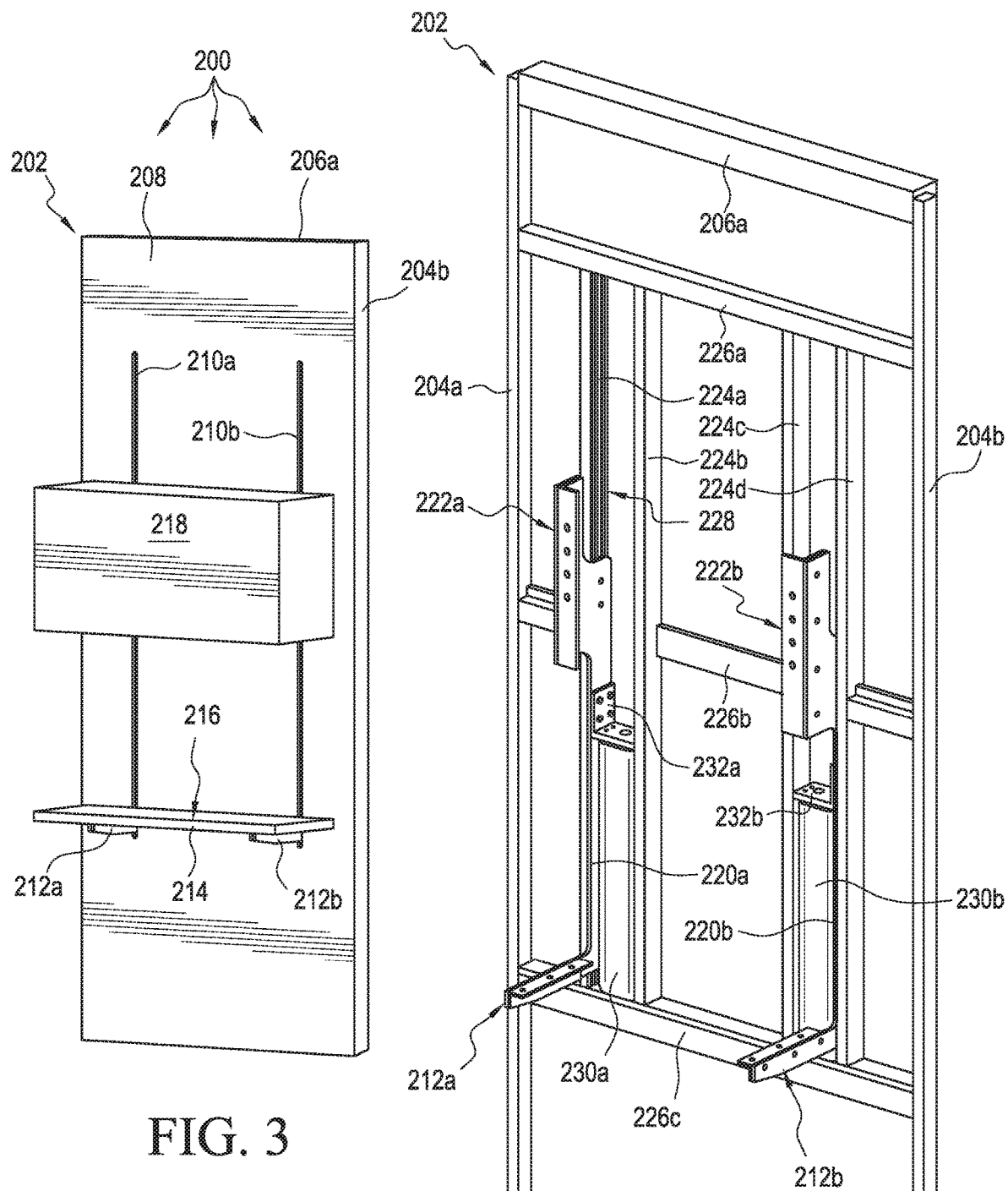
FIG. 3 illustrates a perspective view of a functional wall module with a support surface and an associated compartment in accordance with one implementation of the present invention.
FIG. 4 illustrates a perspective view of a functional wall module with an exposed positioning mechanism and height adjustable bracket in accordance with one implementation of the present invention.

Referring now to FIG. 3, illustrated is a functional wall module 200 that is similar in many respects to the wall module 100 of FIGS. 1 and 2. For example, the functional wall module 200 and its materials, components, and elements may be similar to or the same as the functional wall module 100 (FIG. 1) and any of its respective materials, components, and elements. As a non-limiting example, the functional wall module 200 has a frame 202 that is similar to or the same as the frame 102 of the functional wall module 100 (FIG. 1). Similarly, the panel 208 includes bracket slots 210a, 210b that are similar to or the same as panel 108 and bracket slots 110a, 110b of functional wall module 100 (FIG. 1).

However, the wall module 200 of FIG. 2 additionally includes a cabinet 218 positioned above the platform 214. The cabinet 218 and the platform 214 illustrated in FIG. 3 are selectively movable in a similar or substantially the same manner as described above with respect to platform 114 of FIG. 1. For example, the platform 214 and the cabinet 218 are selectively movable with respect to panel 208 and/or frame 202 along bracket slots 210a, 210b. In one or more implementations, platform 214 and cabinet 218 can move independently from one another along bracket slots 210a, 210b. In one or more alternative embodiments, and as illustrated by FIGS. 3 and 4, platform 214 can be associated with lower bracket arms 212a, 212b and cabinet 218 can be associated with upper bracket arms 222a, 222b. Each of the lower bracket arms 212a, 212b and the upper bracket arms 222a, 222b are integral members of and/or are otherwise coupled to bracket 220a, 220b such that movement bracket 220a, 220b causes the concurrent movement of associated upper and lower bracket arms (222a, 222b and 212a, 212b, respectively).

The panel 208 of functional wall module 200 has been removed in FIG. 4 to reveal the inner components defined by frame 202. The movable platform 214 and the cabinet 218 have been omitted from FIG. 4 for the sake of clarity in describing the interior components of the functional wall module 200 of FIG. 3.

As can be seen in FIG. 4, the lower bracket arms 212a, 212b and the upper bracket arms 222a, 222b are fixedly associated with bracket 220a, 220b. In one or more implementations, one or more of the upper and lower bracket arms are selectively attachable to a bracket and can be positioned at variable distances along the bracket. For example, a lower bracket arm can be integrally coupled to a lower end of the bracket whereas an upper bracket arm is selectively coupled to the bracket at one or more distances away from the lower bracket arm. As another example, the bracket may include a plurality of connection points where the lower and/or upper bracket arms can be selectively coupled at a desired distance away from one another. Alternatively, in one or more implementations, each bracket is a unitary piece that includes integrally associated upper and lower bracket arms at predefined distances from one another (e.g., brackets 220a, 220b of FIG. 4).

It should be appreciated that in the foregoing implementations, and as otherwise described herein, a bracket, such as brackets 220a, 220b of FIG. 4, can each be associated with a single upper and a single lower bracket arm, but in some implementations, a bracket may have any number of bracket arms associated therewith, including, for example, one, two, three, four, five, six, seven, eight, nine, ten, or more bracket arms. Furthermore, it should be appreciated that the bracket arms may be spaced evenly or unevenly along the bracket and may be fixedly or detachably coupled to the bracket.

The brackets 220a, 220b of FIG. 4 are connected to positioning mechanisms 230a, 230b, respectively, by bracket connection plates 232a, 232b. As described above with respect to positioning mechanisms 130a, 130b (FIG. 1), the positioning mechanisms 230a, 230b can include any number or type of suitable actuators that act to selectively adjust the position of the bracket 220a, 220b and any movable platforms associated with one or more of the upper and/or lower bracket arms 222a, 222b, 212a, 212b.

Also similar to the interior components contained within the inner space of the functional wall module 100 defined by the frame 102, the interior components within the inner space of the functional wall module 200 defined by the frame 202 include a plurality of interior vertical supports 224a, 224b, 224c, 224d and a plurality of interior horizontal supports 226a, 226b, 226c that can be selectively configured with each other and/or with one or more vertical frame supports 204a, 204b and/or one or more horizontal frame supports 206a, 206b to orient and/or structurally support positioning mechanisms 230a, 230b at locations within frame 202. In one implementation, the interior horizontal and vertical supports can be placed in varying locations within the frame of the wall module to selectively adjust the distance between two or more positioning mechanisms (and thereby the associated brackets) and/or to selectively adjust the height of the positioning mechanisms relative to each other, interior supports, and/or frame supports within the frame of the wall module.

Referring now to FIG. 5, illustrated is a partial perspective view of the functional wall module of FIG. 4 with exposed, height adjustable brackets 220a, 220b having lower bracket arms 212a, 212b and upper bracket arms 222a, 222b. Lower bracket arms 212b includes two support and/or attachment surfaces, particularly a horizontal attachment surface 234a and a vertical attachment service 234b. The horizontal attachment surface 234a is positioned paralleled with respect to the ground and substantially orthogonal to the main body of bracket 220b and/or one or more interior vertical frame supports. The horizontal attachment surface 234a is depicted as having a given width, which in some implementations may be 1 inch wide, less than 1 inch wide, or greater than 1 inch wide (e.g., 2 inches wide, 3 inches wide, 4 inches wide, 5 inches wide, 6 inches wide, 7 inches wide, 8 inches wide, 9 inches wide, 10 inches wide, 11 inches wide, or 1 foot wide). One having ordinary skill in the art can appreciate that the width of the horizontal attachment surface 234a can be chosen or determined based on manufacturing costs, the amount of surface area desired for attaching and/or supporting an object such as a movable platform, or other considerations. Horizontal attachment surface 234a is depicted as having a plurality of through holes, which may be used to couple an object, such as a movable receptacle, thereto. It should be appreciated that as the width of the horizontal attachment surface increases, the number, spacing, and/or distribution of through-holes may increase.

Lower bracket arm 212b is also illustrated as having a vertical attachment surface 234b. Vertical attachment surface 234b is, in many implementations, orthogonal to horizontal attachment surface 234a. In some implementations, vertical attachment surface 234b is transverse to horizontal attachment surface 234a but may not be substantially orthogonal thereto. In some implementations, and as depicted in FIG. 5, vertical attachment surface 234b is an extension of a lower portion of bracket 220b in a direction substantially orthogonal to a vertical plane that is parallel to one or more of a wall module frame, vertical frame supports, interior vertical supports, and the panel attached to the frame of the wall module.

Similar to the horizontal support surface 234a, the vertical support surface 234b can be coupled to an object, such as a movable platform. Also similar to the horizontal support surface 234a, the vertical support surface 234b includes a plurality of through holes that may assist in coupling an object thereto (e.g., passing a bolt, screw, or similar through the through holes and fastening with a complementary nut or other fastener), and the vertical support surface 234b can have varying widths and/or heights to provide a greater surface area for associating or coupling an object thereto, as described above with respect to horizontal support surface 234a.

The bracket 220b of FIG. 5 additionally includes upper support arm 222b with corresponding movable platform attachment surface 236a and vertical attachment surface 236b. The movable platform attachment surface 236a is substantially parallel to a vertical plane that is parallel to one or more of a wall module frame, vertical frame supports, interior vertical supports, and the panel attached to the frame of the wall module. As depicted in FIG. 5, the movable platform attachment surface 236a is also substantially orthogonal to the horizontal attachment surface 234a of the lower bracket arm 212b. Similar to the attachment surfaces described above, the movable platform attachment surface 236a includes a plurality of through holes that can be used to assist in coupling a device thereto, and the movable platform attachment surface 236a can similarly be any desired width, as described above.

The vertical attachment surface 236b of the upper bracket arm 222b is functionally similar to vertical attachment surface 234b of the lower bracket arm 212b. However, as depicted in FIG. 5, the vertical attachment surface 236b of the upper bracket arm 222b is dimensioned with a greater height than length, whereas vertical attachment surface 234b of the lower bracket arm 212b is the dimensioned with a greater length than height. It should be appreciated that the dimensions and/or proportions of the vertical attachment surfaces 234b, 236b can be, in some implementations, different or the same and can be chosen to accommodate a particular application, manufacturing process, or can be chosen for any reason or no reason.

In some implementations, bracket 220b is manufactured as a single bracket having vertical support surface 234b positioned at a lower bracket arm 212b and the vertical attachment surface 236b positioned at the upper bracket arms 222b. Angle brackets can then be fixedly coupled to one or both of the vertical attachment surfaces 234b, 236b to supply horizontal attachment surfaces 234a, 236a, respectively.

It should be appreciated that bracket 220a and its associated lower bracket arm 212a and upper bracket arm 222a (and the components thereof) are a mirror image of bracket 220b and its associated lower bracket arm 212b and upper bracket arm 222b (and the components thereof). Accordingly, the same foregoing descriptions and implementations provided for bracket 220a and its associated lower bracket arm 212a and upper bracket arm 222a (and the components thereof) are relevant to and can be equally applied to bracket 220b and its associated lower bracket arm 212b and upper bracket arm 222b (and the components thereof).

In some implementations, the brackets 220a, 220b are height adjustable and synchronized such that the brackets 220a, 220b move at substantially the same time and at substantially the same rate. In other implementations, each bracket moves independently. It should be appreciated, however, that if the movable platform spans one or both of the lower bracket arms and the upper bracket arms, it is often beneficial to have the movement of the bracket arms synchronized. In doing so, torsional stress can be reduced or eliminated that would otherwise arise as a result of uneven or differential movement of the attachment surfaces supporting the movable platform. Synchronized movement can also ensure a level surface or retention of a predefined configuration of objects associated with the attachment surfaces of the bracket arms.

In one or more implementations, the synchronized movement of brackets can be implemented by having each positioning mechanism associated with the brackets controlled by a single motor, or, in some implementations, the synchronized movement of brackets can be implemented by having each positioning mechanism associated with an individual motor that is under the direction of a master control unit. Such a master control unit can be configured to control the rate and direction of movement applied to the brackets by the positioning mechanisms to ensure synchronized movement.

In some implementations, portions of the brackets (e.g., brackets 220a, 220b) and associated components can be stabilized and/or directed during positioning/repositioning through association with one or more guide members (e.g., guide members 128, 228). Referring now to FIG. 6, illustrated is interior vertical support 224a having associated therewith guide member 228. The guide member 228 is depicted as a track for roller bearings or wheels 238a, 238b. The roller bearings or wheels 238a, 238b are also coupled to bracket 220a so that when the bracket 220a is repositioned by positioning mechanism 230a, the roller bearings or wheels 238a, 238b roll along the track 228, thereby stabilizing the transition between positions and also, in some implementations, providing a smooth transition therebetween.

Although FIG. 6 illustrates roller bearings or wheels 238a, 238b associated at a lower portion of bracket 220a, an additional one or more roller bearings can be associated with bracket 220a at one or more positions along bracket 220a. For example, an additional pair of roller bearings or wheels can be associated with an upper portion of bracket 220a, proximate the upper bracket arm 222a.

Further, although the guide member of FIG. 6 is depicted as being a track having associated roller bearings or wheels, it should be appreciated that in some implementations the guide member can include a rack with associated pinion(s) coupled to the bracket such that movement of the bracket causes the associated pinion(s) to traverse its complementary rack. Additionally, or alternatively, the guide member can include a pulley system, pneumatics, or similar.

It should be understood that although FIG. 6 is directed to bracket 220a, the same foregoing description can apply to bracket 220b in association with interior vertical support 224d and a guide member associated therewith. Similarly, where appropriate, the same foregoing description can be applied to the functional wall module 100 of FIGS. 1 and 2.

Figure 7:
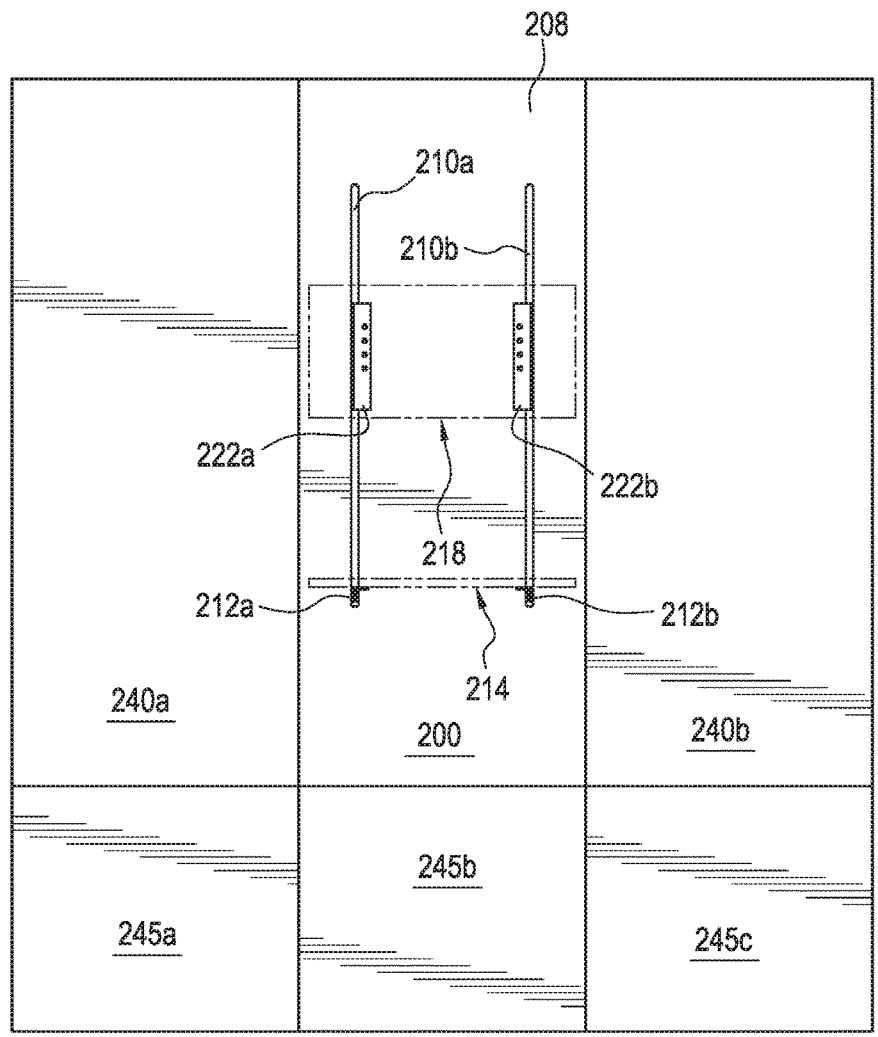
FIG. 7 illustrates a front view of an exemplary modular wall system that includes a functional wall module having a height adjustable bracket in accordance with one implementation of the present invention.

In some implementations, the modular wall assembler may connect multiple functional and/or nonfunctional wall modules to form various wall structures or modular walls. Such modular walls may include a single or a plurality of functional wall modules having one or more movable brackets (which can be associated with one or more platforms, cabinets, shelves, etc.) that can be selectively positioned and repositioned. For example, FIG. 7 illustrates a modular wall that includes a functional wall module 200 and a plurality of nonfunctional wall modules 240a, 240b, 245a, 245b, and 245c. As depicted, the functional wall module 200 includes a panel 208 having bracket slots 210a, 210b that accommodate lower bracket arms 212a, 212b and upper bracket arms 222a, 222b. As described above with respect to wall module 200, the lower bracket arms 212a, 212b and upper bracket arms 222a, 222b are associated with the same unifying bracket (not shown) and therefore move in concert with each other. Accordingly, the platform 214 connected to lower bracket arms 212a, 212b and the cabinet 218 connected to upper bracket arms 222a, 222b move concurrently when the lower 212a, 212b and upper 222a, 222b bracket arms transit the bracket slots 210a, 210b.

Additionally depicted in FIG. 7 are nonfunctional wall modules 240a, 240b and partial height nonfunctional wall modules 245a, 245b, and 245c. Nonfunctional wall modules 240a and 240b are depicted as connected to—and flanking—functional wall module 200. In some implementations, the combination of functional and nonfunctional wall modules 240a, 200, 240b is a modular wall or a portion of a modular wall.

In some implementations, it may be desirous to increase the height of a modular wall. Generally, this can be accomplished by stacking partial height wall modules on top of each other or by stacking a combination of partial height and full height wall modules on top of each other. For example, as depicted in FIG. 7, the height of a modular wall is increased by connecting a plurality of partial height nonfunctional wall modules 245a, 245b, and 245c with each other in a linear fashion and mounting wall modules 240a, 200, and 240b on top of the connected partial height nonfunctional wall modules 245a, 245b, and 245c, respectively. It should be appreciated that in some implementations, any number of functional wall modules may be detachably or non-detachably connected to any number of other functional wall modules and/or to any number of nonfunctional wall modules to achieve a desired result (e.g., adjusted wall height, desired configuration of wall heights, functional/nonfunctional wall module placement, etc.).

Figure 8B:
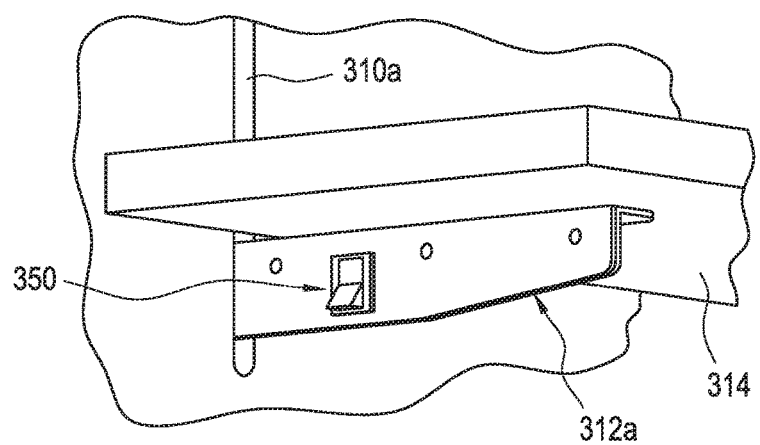
FIG. 8B illustrates a partial perspective view of a functional wall module with an integrated controller in accordance with one or more implementations of the present invention.
Figure 8A:
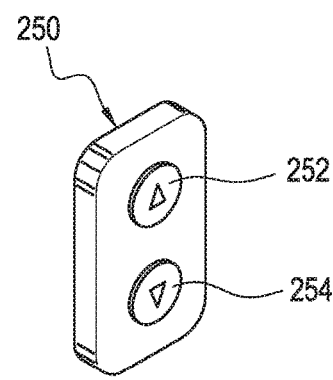
FIG. 8A illustrates a perspective view of a controller for a functional wall module in accordance with one implementation of the present invention.

Now referring to FIGS. 8A and 8B, a functional wall module may include a control mechanism or a controller, which can direct a power source and/or a positioning mechanism to position and/or reposition the bracket at a selected location. One exemplary controller 250 is illustrated in FIG. 8A. Particularly, the controller 250 may be a wireless controller, which may wirelessly signal the power supply to activate the positioning mechanisms that may position and reposition the brackets and associated movable platforms, cabinets, compartments, etc.

For instance, the controller 250 may include one or more input devices or inputs, such as an "up" button 252 and a "down" button 254. Pressing the "up" button 252 causes the movable platform to move upward. Conversely, pressing the "down" button 254 causes the movable platform to move downward.

One of skill in the art will recognize that there are a number of different wireless communication mechanisms or systems that may be used to connect or couple the controller 250 with a power source in a manner that will allow the controller 250 to send wireless signals to the power source. For example, the controller 250 may communicate with the power source via radio frequency identification ("RFID") signals, infrared signals, or another wireless transmission signal. It should be appreciated that the power source may include a suitable receiver configured to receive signals from the controller 250.

As described above, the movable platform may move relative to the frame and/or panel of the functional wall module in any number of directions. Hence, the controller may include any number of suitable inputs, which may cause the movable platform to move in directions corresponding to such inputs. Moreover, configuration and/or layout of the inputs on the controller may vary from one implementation to another. For example, inputs may be configured as one or more flip switches, rheostats (e.g., rotatable rheostats, scrolling rheostats, etc.), potentiometers, touch sensitive controls, voice activated controllers, and the like.

Additionally, or alternatively, a controller may communicate with the power source via a wired communication connection. For example, FIG. 8B illustrates a partial view of a functional wall module that includes a wired controller 350. The functional wall module and its materials, elements, or components can be similar to or the same as any of the functional wall modules described herein. For instance, the functional wall module of FIG. 8B may include a platform 314 that is configured to be moved along bracket slot 310a as described above with respect to platforms 114 and 214.

The wire that connects the controller 350 to the power source can be at least partially hidden from view (e.g., the wire may extend behind the bracket and/or panels of the functional wall module. In the implementation depicted in FIG. 8B, the controller 350 is secured to the bracket and moves together with the bracket 312a and the movable platform 314. Generally, however, the controller 350 can be secured anywhere on or near the functional wall module. For instance, the controller can be secured to the frame and/or to a panel of the functional wall module.

As depicted in FIG. 8B, the controller 350 includes an input switch that can be moved in one or more directions to cause the movable platform 314 to move in the corresponding directions. For example, moving the input switch upward may cause the movable platform 314 to move upward, while moving the input switch downward may cause the movable platform to move downward.

One will appreciate that the modular walls and functional wall modules (generally) benefit users in a wide variety of applications, including applications that require movement of on-wall componentry or objects. For example, the modular walls of the present disclosure may at least partially define or form classrooms, offices, retail space, etc. The modular walls of the present disclosure also may be particularly suitable to retail businesses, such as stores that have shelving units that hold products for sale. Shelving units could be moved to accommodate the size of the products and to maximize use of the wall space.

Additionally, functional and non-functional wall modules can be interconverted without disassembling the modular wall. For example, a functional wall module can be converted to a nonfunctional wall module by removing the bracket and attaching a uniform panel (e.g., a panel lacking bracket slots) to the associated frame. In one or more implementations, additional components may be removed from the functional wall module as well, including, for example, the positioning mechanism and/or one or more interior horizontal/vertical supports.

Similarly, a nonfunctional wall module can be converted to a functional wall module by installing positioning mechanism(s), interior horizontal/vertical support(s), associated guide member(s), and/or bracket(s) together with a panel having bracket slots that align with the installed brackets. In an implementation, a wall is converted to a functional wall module by adding a bracket to an already existing interior framework comprising a guide member and a positioning mechanism and by placing a panel having a bracket slot that aligns with the installed bracket.

As described above, the interconversion of nonfunctional wall modules to functional wall modules, and vice versa, can be accomplished without disassembling the modular wall and/or without interchanging one or more frames and/or wall modules. Additionally, or alternatively, in one or more implementations, aspects of functional wall modules can be adjusted without replacing the wall module, itself, and/or disassembling a modular wall incorporating the functional wall module. For example, the number of bracket arms can be increased or decreased and/or the spacing between bracket arms can be increased or decreased within the framework of the functional wall module without disassembling the modular wall or otherwise interchanging wall modules with an assembled modular wall.

This may be accomplished in one or more implementations by removing the panel associated with the functional wall module and making adjustments to one or more interior vertical and/or horizontal supports (e.g., increasing/decreasing the distance between supports, increasing/decreasing the number of interior vertical and/or horizontal supports) and/or switching a bracket for another bracket having greater or fewer bracket arms (e.g., replacing a single-arm bracket with a bracket having two bracket arms). Upon making the desired adjustments, a panel can be attached to the frame of the functional wall module. In one or more implementations, the panel associated with the functional wall module after the desired adjustments is different than the panel associated with the functional wall module before the desired adjustments. For example, a new panel may include bracket slots that align with the adjusted bracket arms so that when the panel is attached to the frame of the functional wall module, the bracket arms align with and protrude through the bracket slots.

Other modifications to the number, orientation, and mechanism of positioning and/or repositioning brackets are considered within the scope of this disclosure, and the foregoing is intended to serve as an exemplary list of ways to adjust wall module components and not as an exhaustive list of the only ways to adjust wall module components.

Abbreviated List of Defined Terms

To assist in understanding the scope and content of the foregoing and forthcoming written description and appended claims, a select few terms are defined directly below. Unless defined otherwise, all technical and scientific terms used herein have the same meaning as commonly understood by one of ordinary skill in the art to which the present disclosure pertains.

As used herein, the term "functional wall module" means any wall module configured to be associated with a positioning mechanism and/or a selectively movable bracket associated therewith. In many implementations, a functional wall module will be associated with panels having one or more bracket slots on the surface thereof. A functional wall module, in some implementations, can be selectively converted to a nonfunctional wall module by removal of the positioning mechanism and/or bracket and/or by association with panels lacking bracket slots.

As used herein, the term "movable platform" includes one or more of a shelf, shelving unit, cabinet, container, compartment, work surface, desk top, monitor, computer input device (e.g., keyboard, touch enabled screen, etc.), etc. Accordingly, when used above, the term "movable platform" is intended to be a broad term encompassing the foregoing. For example, the brackets 220a, 220b can be associated with two or more movable platforms, as described above. As a non-limiting example of the foregoing, a monitor can be attached to the upper bracket arms 222a, 222b while a desk top or work surface is attached to one or more of the lower bracket arms 212a, 212b. Both the monitor and the desk top fall within the scope of the term "movable platform," as used herein.

The term "nonfunctional wall module," as used herein, is made with reference to wall modules that lack an associated positioning mechanism and/or selectively movable bracket and/or wall modules associated with panels lacking bracket slots. In some implementations, a nonfunctional wall module can be selectively converted to a functional wall module by the addition of a positioning mechanism and bracket and by association with panels that includes bracket slots. It should be appreciated that function and nonfunctional wall modules can selectively and detachably connect to one another in a manner that forms the modular wall, and the "nonfunctional" modifier is not made with reference to the wall module's functionality to interconnect and form a modular wall.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes that come within the meaning and range of equivalency of the claims are to be embraced within their scope.

What is claimed is:

1. A functional wall module for at least partially forming an individual space in a building and for positioning and selectively repositioning one or more objects within the individual space, the functional wall module comprising:
a frame comprising one or more vertical frame supports and one or more horizontal frame supports, the frame defining an interior space;
two or more interior supports disposed within the interior space, the two or more interior supports comprising:
two or more interior vertical supports, each connected to at least one of the one or more horizontal frame supports, such that the two or more interior vertical supports are spaced apart from the one or more vertical frame supports; or
two or more interior horizontal supports, each connected to at least one of the one or more vertical frame supports, such that the two or more interior horizontal supports are spaced apart from the one or more horizontal frame supports;
at least one panel selectively and detachably connected to the frame, the at least one panel having one or more bracket slots disposed vertically within a front face of the panel;
two or more brackets, each associated with one of the two or more interior supports, each bracket comprising one or more bracket arms extending away from the interior space and from the corresponding interior support,
wherein the bracket arms are configured to support or couple to one or more movable platforms, and
wherein a first portion of each bracket arm passes through one of the one or more bracket slots of the at least one panel, and
wherein the one or more bracket arms comprise a lower bracket arm and an upper bracket arm; and
at least one positioning mechanism positioned within the interior space, each positioning mechanism connected to at least one of the two or more brackets, wherein each positioning mechanism is operable to selectively reposition the at least one bracket connected thereto.

2. The functional wall module as recited in claim 1, wherein the at least one panel is connected to the frame in a manner that at least partially conceals the interior space.

3. The functional wall module as recited in claim 2, wherein a second portion of each bracket arm has at least one dimension or shape that prevents the second portion from passing through the bracket slot through which the corresponding first portion passes.

4. The functional wall module as recited in claim 3, wherein at least one of the one or more bracket slots is elongate and disposed about a path that one of the one or more bracket arms is configured to transit during repositioning of the bracket by the positioning mechanism.

5. The functional wall module of claim 1, wherein the bracket arms further comprise one or more attachment surfaces.

6. The functional wall module of claim 5, wherein the bracket arms are configured to support or couple to the one or more movable platforms via the one or more attachment surfaces.

7. The functional wall module of claim 6, wherein the one or more attachment surfaces comprise one or more of a horizontal attachment surface, a vertical attachment surface, or a movable platform attachment surface.

8. The functional wall module of claim 1, wherein each of the lower bracket arm and the upper bracket arm further comprise a vertical attachment surface and one or more of a horizontal attachment surface or a movable receptacle attachment surface.

9. The functional wall module of claim 8, wherein the movable platform comprises one or more of a shelf, a cabinet, a work surface, or a monitor.

10. The functional wall module of claim 1, wherein the interior support further comprises a guide member operable to stabilize the bracket.

11. The functional wall module of claim 10, wherein the guide member further comprises a track and wherein the bracket is associated with one or more roller bearings or wheels configured to roll within the track.

12. A modular wall for creating an individual space and positioning and repositioning one or more objects within the individual space, the modular wall comprising:
one or more wall modules selectively and detachably connected together, the one or more wall modules including a functional wall module comprising:
a frame defining an interior space of the functional wall module;
a positioning mechanism disposed within the interior space;
at least one panel connected to the frame, the panel comprising one or more bracket slots;
a bracket associated with the positioning mechanism and comprising a lower bracket arm and an upper bracket arm, wherein each of the lower bracket arm and the upper bracket arm passes through one of the one or more bracket slots and extends away from the interior space and from the frame, and wherein the positioning mechanism is operable to reposition the bracket;
a first movable platform connected to the lower bracket arm; and
a second movable platform connected to the upper bracket arm, wherein the upper bracket arm comprises an attachment surface that is substantially parallel to a vertical plane that is parallel to the frame of the functional wall module, the attachment surface comprising a flange having one or more mounting holes.

13. The modular wall as recited in claim 12, wherein the upper and lower bracket arms are fixedly associated with the bracket such that the upper and lower bracket arms remain equidistant during repositioning of the bracket.

14. The modular wall as recited in claim 13, wherein the at least one panel is selectively and detachably connected to the frame, and wherein the one or more bracket slots are sized and shaped to permit at least a portion of the upper and lower bracket arms to transit the bracket slots during repositioning of the bracket.

15. The modular wall as recited in claim 14, wherein the first movable platform comprises a work surface, and wherein the second movable platform comprises a cabinet.

16. A method for installing a functional wall module, comprising:
   providing a frame having one or more horizontal frame supports and one or more vertical frame supports;
   securing one or more interior supports to the frame, such that the one or more interior supports are disposed within an interior space defined by the horizontal and vertical supports of the frame;
   securing a positioning mechanism within the interior space;
   securing a panel to the frame, such that the panel at least partially conceals the interior space, the panel having one or more bracket slots disposed vertically within a front face of the panel; and
   securing one or more bracket arms to the one or more interior supports after the panel has been secured to the frame,
      wherein the one or more bracket arms comprise a lower bracket arm and an upper bracket arm, and
      wherein a first portion of each bracket arm passes through one of the one or more bracket slots and is secured to one of the one or more interior supports, and a second portion of each bracket arm has at least one dimension or shape that prevents the second portion from passing through the bracket slot through which the corresponding first portion passes, such that the second portion of each bracket arm remains outside of the interior space of the frame when the first portion is secured to one of the one or more interior supports.

17. The method as recited in claim 16, wherein securing the one or more interior supports to the frame further comprises at least one of:
   securing one or more interior vertical supports to at least one of the one or more horizontal frame supports, such that the one or more interior vertical supports are spaced apart from the one or more vertical frame supports; or
   securing one or more interior horizontal supports to at least one of the one or more vertical frame supports, such that the one or more interior horizontal supports are spaced apart from the one or more horizontal frame supports.

18. The method as recited in claim 16, wherein the one or more interior supports further comprises one or more guide members operable to stabilize the one or more bracket arms, the one or more guide members each comprising a track and wherein the one or more bracket arms are associated with one or more roller bearings configured to roll within the track.

19. The method as recited in claim 16, wherein installing the functional wall module comprises converting an existing non-functional wall module into a functional wall module by securing the one or more interior supports to the frame of the non-functional wall module.

* * * * *